United States Patent [19]
Okamatsu

[11] 4,423,123
[45] Dec. 27, 1983

[54] ELECTRIC STORAGE BATTERY AND A METHOD OF MAKING THE SAME

[75] Inventor: Sadao Okamatsu, Fukaya, Japan

[73] Assignee: Shin-Kobe Electric Machinery Co., Ltd., Tokyo, Japan

[21] Appl. No.: 240,178

[22] Filed: Mar. 3, 1981

Related U.S. Application Data

[62] Division of Ser. No. 140,966, Apr. 17, 1980, abandoned.

[51] Int. Cl.³ .............................................. H01M 2/24
[52] U.S. Cl. ..................................... 429/160; 429/161
[58] Field of Search ............... 429/160, 161; 29/623.1, 29/623.2; 219/91.23, 107

[56] References Cited

U.S. PATENT DOCUMENTS

| | | | |
|---|---|---|---|
| 2,883,443 | 4/1959 | Ruetschi et al. | 429/161 |
| 3,640,775 | 2/1972 | Fitchman et al. | 429/161 |
| 3,723,699 | 3/1973 | Allen | 219/107 |
| 3,793,086 | 2/1974 | Badger | 429/160 |
| 3,844,841 | 10/1974 | Baker | 429/160 |
| 4,098,966 | 7/1978 | Brown | 429/161 |

FOREIGN PATENT DOCUMENTS 1278585 6/1972 United Kingdom ............... 228/901

Primary Examiner—Anthony Skapars

Attorney, Agent, or Firm—Pearne, Gordon, Sessions, McCoy, Granger & Tilberry

[57] ABSTRACT

This invention pertains to an electric storage battery and more particularly to a connector for electrically connecting adjacent cells of the electric storage battery with each other.

The electric storage battery comprises a battery case having partition walls provided to form compartments therein, cell components disposed within the respective compartments and including a plurality of positive and negative plates alternately arranged with insulating separators disposed between the adjacent positive and negative plates, and connectors provided between the adjacent cell components for electrically connecting them. Each of the connectors comprises first plate lugs of the positive plates for one of the adjacent cell components and second plate lugs of the negative plates for the other of the adjacent cell components, the first and second plate lugs facing each other through the corresponding partition wall of the battery case and being deformed to be gathered together and being welded integrally with each other. The first and second plate lugs may be welded through an opening in the corresponding partiton wall. Otherwise, the first and second plate lugs may be welded at the top of the corresponding partition wall of the battery case.

6 Claims, 10 Drawing Figures

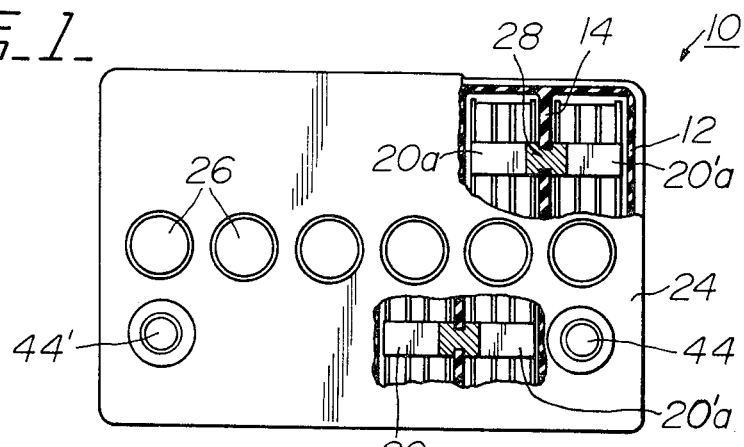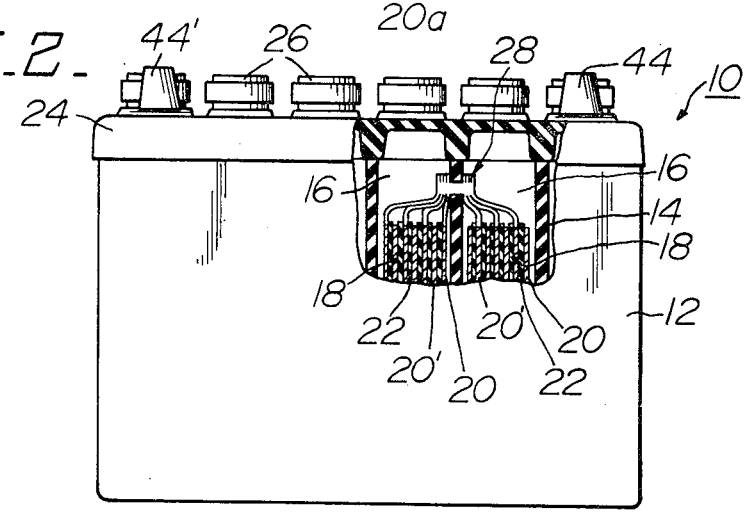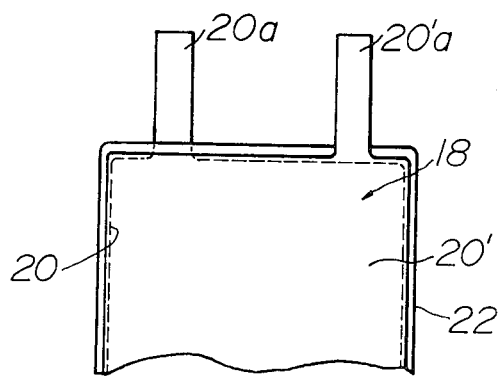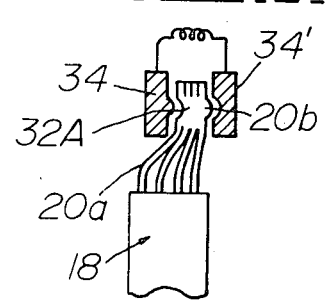

ELECTRIC STORAGE BATTERY AND A METHOD OF MAKING THE SAME

This is a division of application Ser. No. 140,966 filed Apr. 17, 1980, now abandoned.

BACKGROUND OF THE INVENTION

A typical prior connector of adjacent cell components of an electric storage battery has been disclosed in the U.S. Pat. Nos. 3,313,658 and 3,897,269 issued on Apr. 11, 1967 and July 29, 1975, respectively. The connector of these patents comprises connector straps positioned to face each other through an opening in a corresponding partition wall of a battery case in compartments of which the cell components are contained, respectively. One of the connector straps is provided on positive plate lugs for one of the adjacent cell components to connect the positive plate lugs while the other connector strap is provided on negative plate lugs for the other adjacent cell component to connect the negative plate lugs. Providing the connector straps on the plate lugs causes the process of producing the connector to be troublesome because the straps have to be provided by casting. The faced connector lugs are projection-welded through the opening in the corresponding partition wall. To do this, the connector lugs are essentially in contact with each other by any suitable means. It has been disclosed in the prior art that, to this end, one of the connector lugs has a nose provided thereon while the other connector lugs has a depression provided therein to be forced past the nose of the one connector lug. Alternatively, both of the faced connector lugs have projections provided thereon, respectively, to be in contact with each other through the opening in the partition wall. Otherwise, an intermediate insert member positioned in the opening in the partition wall is placed between recesses in the faced connector lugs. However, any of these makes the cell components to be placed in the compartments of the battery case with difficulty because the nose, the projections or the intermediate insert member interfere with the corresponding partition wall or the connector lugs. Thus, it will be noted that the prior electric storage battery could not be produced with effectiveness. It will be also noted that there are required at least two welded portions between the plate lugs and the connector straps and between the faced connector lugs, which causes the electrical resistance between the adjacent cell components to be increased and therefore the electrical characteristic to be deteriorated.

SUMMARY OF THE INVENTION

Accordingly, it is a principal object of the invention to provide an electric storage battery adapted to be produced with more effectiveness.

It is another object of the invention to provide an electric storage battery adapted to improve the electric characteristic thereof.

In accordance with one aspect of the invention, there is provided an electric storage battery comprising a battery case having partition walls provided to form compartments therein, cell components disposed within the respective compartments and each including a plurality of positive and negative plates alternately arranged with insulating separators disposed between the adjacent positive and negative plates, and connectors provided between said adjacent cell components for electrically connecting them, characterized by each of said connectors comprising:

first plate lugs of said positive plates for one of said adjacent cell components;

second plate lugs of said negative plates for the other cell component;

said first and second plate lugs facing each other through the corresponding partition wall of said battery case;

and a welded portion of said first and second plate lugs being deformed to be gathered together.

BRIEF DESCRIPTION OF THE DRAWINGS

The above and other objects and features of the invention will be apparent from the description of the embodiments taken with the accompanying drawings in which;

FIG. 1 is a top view of an electric storage battery constructed in accordance with the invention with portions broken away;

FIG. 2 is a front view of the electric storage battery of FIG. 1 with a portion broken away;

FIG. 3 shows one cell component of the electric storage battery;

FIGS. 4A to 4C illustrate sequential steps for making a connector of the electric storage battery;

FIG. 5 illustrates forcing and welding one group of plate lugs to be gathered together;

FIG. 6 illustrates the plate lugs deformed as in FIG. 5 and facing each other through an opening in a corresponding partition wall;

and FIGS. 7A and 7B illustrate sequential steps for making a modified connector of the electric storage battery.

DETAILED DESCRIPTION OF THE EMBODIMENTS

FIGS. 1 and 2 show an electric storage battery 10 constructed in accordance with the invention. The electric storage battery 10 comprises a battery case 12 which may be of acid-resisting plastics and having partition walls 14 provided to form compartments 16 therein, and cell components 18 disposed within the respective compartments 16.

Each of the cell components 18 includes a plurality of positive and negative plates 20 and 20' alternately arranged with insulating separators 22 disposed between the adjacent positive and negative plates 20 and 20' as shown in FIGS. 2 and 3. The positive and negative plates 20 and 20' have respective plate lugs 20a and 20'a of lead material integrally provided therewith. As shown in FIG. 1, the positive plate lugs 20a are arranged in alignment with each other while the negative plate lugs 20'a are also arranged in alignment with each other. The cell components 18 are placed in the battery case 12 so that the group of positive plate lugs 20a of one of the adjacent cell components 18 face the group of negative plate lugs 20'a of the other adjacent cell component 18 through an opening 14a in the corresponding partition wall 14 positioned between the adjacent cell components 18, as shown in FIG. 4A. The battery case 12 is closed by a cover 24 which may be also of acid-resisting plastics and which is secured to the battery case 12 by any suitable means. In FIGS. 1 and 2, numerals 26 designate plugs openable for pouring battery solution into the battery case 12.

A connector 28 is provided between the adjacent cell components 18 to electrically connect them with each other. It is one of the most important features of the invention that the connector 28 comprises the first or positive plate lugs 20a of one of the adjacent cell components 18 and the second or negative plate lugs 20'a of the other adjacent cell component 18, both of which lugs are directly welded through the corresponding partition wall 14.

FIGS. 4A to 4C illustrate sequential steps for making the connector 28 for the adjacent cell components 18. As shown in FIG. 4A, the top edges of the first and second groups of plate plugs 20a and 20'a are gathered toward the corresponding partition wall 14 and trued up by cutting them at the line x. Alternatively, the top edges of the plate lugs 20a and 20'a might not be cut so as to leave them of non-uniform height. After that, as shown in FIG. 4B, a pair of welding electrodes 30 and 30' of a welding machine, not shown, are lowered until they are disposed on the outsides of the gathered plate lugs 20a and 20'a and forced against them so that they are deformed to be engaged against each other through the opening 14a in the corresponding partition wall 14. Finally, as shown in FIG. 4C, an electric current flows through the pair of welding electrodes 30 and 30' so that the first and second groups of plate lugs 20a and 20'a are projection-welded integrally with each other through the openings 14a in the corresponding partition wall 14. In FIG. 4C, a numeral 32 designates a welded portion of the first and second plate lugs 20a and 20'a. The welding machine used for the invention may be one which is disclosed in U.S. Pat. No. 4,013,864 and commercially manufactured by Tiegel Manufacturing Company, Belmont, Calif. It will be understood that the first and second plate lugs 20a and 20'a should be longer than the conventional plate lugs because the former can reach the opening in the partition walls 14.

As illustrated in FIGS. 5 and 6, the first and second groups of plate lugs 20a and 20'a may be deformed by another pair of welding electrodes 34 and 34' so that the upper part of the plate lugs 20a or 20'a may have a projection 20b or 20'b provided at the side thereof facing the opening 14a and then projection-welded at 32A and 32B integrally with each other. Thereafter, the deformed and welded plate lugs 20a and 20'a may be so positioned that the projections 20b and 20'b are abutted against each other through the opening 14a in the corresponding partition wall 14 and projection-welded in the same manner as described in connection with FIG. 4C.

FIGS. 7A and 7B illustrate sequential steps for making a modified connector 128 of the invention. In the method of FIG. 7, the first and second groups of plate lugs 20a and 20'a of the adjacent cell components 18 are disposed on both sides of an insulating separator 38 and gathered together at the top edges thereof. A die 36 may be provided at the gathered top edges of the first and second groups of plate lugs 20a and 20'a. Thereafter, solid lead 40 may be placed in the die 36 and melted by a burner 42 so as to weld the top edges of the first and second plate lugs 20a and 20'a with each other as shown in FIG. 7A. The thus welded plate lugs 20a and 20'a are placed together with the cell components 18 in the compartments 16 so that the connector 128 of the welded plate lugs 20a and 20'a are mounted on the top edge of the corresponding partition wall 14 as shown in FIG. 7B. Alternatively, the first and second plate lugs 20a and 20'a may be welded after they are placed in the compartments 16. Molten lead material may be poured into the die 36 in place of solid lead material.

It will be noted that, with the invention, conventional lead straps are not required. Accordingly, the electric storage battery can be produced with more effectiveness. Also, it will be noted that the adjacent cell components 18 can be connected at only one welded portion 32. It should be noted that this makes the electric resistance between the adjacent cell components 18 to be decreased, and that as a result the electrical characteristic of the electric storage battery can be more improved.

Positive and negative electrodes 44 and 44' may be connected with the positive plate lugs 20a of one of the outermost cell components 18 and the negative plate lugs 20'a of the other outermost cell component 18, respectively, in a conventional manner and extend through the cover 24 so as to project therefrom.

While some preferred embodiments of the invention have been described and illustrated with reference to the accompanying drawings, it will be understood by those skilled in the art that they are by way of example, and that various changes and modifications might be made without departing from the spirit and scope of the invention, which is intended to be defined only to the appended claims.

What is claimed is:

1. An electric storage battery comprising a battery case having partition walls provided to form compartments therein, cell components disposed within the respective compartments and each including a plurality of positive and negative plates alternately arranged with insulating separators disposed between the adjacent positive and negative plates, and connectors provided between the adjacent cell components for electrically connecting them, characterized by each of said connectors comprising;
   first plate lugs of said positive plates for one of said adjacent cell components;
   second plate lugs of said negative plates for the other cell component;
   said first and second plate lugs facing each other through the corresponding partition wall of said battery case;
   and a welded portion of said first and second plate lugs being deformed to be gathered together;
   all said plate lugs being unitary with and of substantially the same thickness as the respective plates, said welded portion being the gathered-together group of first plate lugs on one side of a partition wall and the gathered-together group of second plate lugs on the other side of the partition wall with a portion of each of the proximate one of said first and second plate lugs deformed toward each other to be in mutual contact and welded together.

2. An electric storage battery as set forth in claim 1, wherein said welded portion is provided through an opening in said corresponding partition wall.

3. An electric storage battery as set forth in claim 1, wherein said welded portion is provided at the top edge of said corresponding partition wall.

4. An electric storage battery as set forth in claim 1, wherein said welded portion includes each of said plate lugs having a deformed portion corresponding to and aligned with the deformed portion of the respective proximate plate to be mutually in contact with each other.

5. An electric storage battery as set forth in claim 4, wherein said welded portion includes only a reduced area part of the mutually in contact plate lugs.

6. An electric storage battery as set forth in claim 4, wherein said deformed portion of each said plate lug is a reduced area central portion thereof.

* * * * *